United States Patent [19]

Humberstone et al.

[11] 4,050,358
[45] Sept. 27, 1977

[54] DIAPHRAGM AND METHOD OF MAKING

[75] Inventors: John Humberstone, Westminster; William L. Deal, El Segundo; Arthur E. Edgington, Westminster, all of Calif.

[73] Assignee: Harbor Products, Inc., Long Beach, Calif.

[21] Appl. No.: 725,364

[22] Filed: Sept. 22, 1976

[51] Int. Cl.$^2$ .................. F01B 19/00; F16J 3/02
[52] U.S. Cl. .................. 92/103 F; 92/103 SD; 264/258
[58] Field of Search .......... 92/103 SD, 103 F, 103 R, 92/47; 428/64, 66, 80; 264/258, 153

[56] References Cited
U.S. PATENT DOCUMENTS

| 1,473,998 | 11/1923 | Mixsell | 92/103 R |
| 2,380,983 | 8/1945 | Mock | 92/103 F |
| 2,964,442 | 12/1960 | Hansen | 264/258 |

FOREIGN PATENT DOCUMENTS 226,552  2/1958  Australia .................. 92/103 F

Primary Examiner—Martin P. Schwadron
Assistant Examiner—Abraham Hershkovitz
Attorney, Agent, or Firm—Whann & McManigal

[57] ABSTRACT

A flexible diaphragm with a U-shaped surrounding fold, containing a plurality of reinforcing fabric members of cross-shaped configuration cut from an elastomer or other suitably coated sheet of material of woven fabric in which the threads are in right-angled relation, each of the cut members having outwardly tapered arms extending from a central area, the cross-shaped configuration having an orientation with respect to the threads of the fabric such that the right-angled threads will extend longitudinally and transversely of each arm, in which the cross-shaped members are stacked in superimposed axial relation with the radiating arms of adjacent cut members being successively offset and having their edges in overlapped relation, and wherein the stacked cut members are encased within a molded elastomeric or other suitable material.

14 Claims, 6 Drawing Figures

DIAPHRAGM AND METHOD OF MAKING

BACKGROUND OF THE INVENTION

The present invention relates generally to flexible diaphragms.

More specifically, the present invention constitutes improvements in the diaphragm structure as shown and described in U.S. Pat. No. 2,678,065, in which the reinforcing member comprises a plurality of stacked fabric rubber-coated strips of a ribbon material in which the woven threads are in right-angled relation, the ribbon members being axially stacked with the adjacent strips being successively angularly offset to position the edges of the projecting end portions in overlapped relation.

It has been found that the use of ribbon materials for the reinforcing members requires procedures which are costly and uneconomical. For example, it is uneconomical and time consuming to coat a fabric ribbon of narrow width, such as 1¼-inches. It is also a time consuming and expensive procedure to successively stack the ribbon strips one-by-one in laying up the reinforcing structure prior to the molding operation.

Accordingly, attempts have heretofore been made to provide a more economical and faster procedure for the production of the reinforcing fabric structure than is possible with the single ribbon strips. To this end, it has been proposed that the fabric material should be coated in sheet-roll form, e.g., of a width of more or less 50-inches and thereafer slit the coated sheet to provide the elongate strips for use in place of the ribbon strips as heretofore used. The process of providing slit strips from a wide sheet of fabric material, although cutting down the coating time, presents a problem for the reason that the side edges of the cut strips have a tendency to fray during use. The coating material fails to retain and prevent fraying or dislodgment of the edge threads. Thus, dislodged threads, during use of the diaphragm, have been found to work through the U-shaped surrounding fold and cause leakage. Another concept has also been tried with a view to reducing the time required for coating the ribbon-type fabric, and laying up or stacking of the ribbon elements prior to the molding operation. In this concept, it has been proposed to coat the fabric in roll-sheet form and then die-stamp fabric members of cross-shaped configuration with four projecting radially extending arms having parallel opposite edges, and wherein the woven threads in each arm extends longitudinally and transversely thereof. While this procedure reduces the time required, it still has the undesirable drawback that the edges of the arms were still subject to fraying out, and the threads which extend along the edges could readily become detached during use and provide a potential cause of diaphragm leakage.

According to the present invention, it has been found that the problems as enumerated above can be materially reduced or overcome by coating the fabric material in roll-sheet form, and by changing the configuration of the diepunching from one having arms with parallel edges, to a punching in which the arms radiate from a central portion and have outwardly converging opposite side edges. Similarly, the right-angled threads of the woven fabric are oriented in the punching so that they extend longitudinally and transversely of each arm. As thus arranged, it will be appreciated that there are no edge threads that can become dislodged, and since both the longitudinal and transversely extending threads are severed at an angle along each side of the arm, the severed ends will be securely anchored and fraying will be prevented along the edges of the arms.

SUMMARY OF THE INVENTION

The present invention relates more specifically to a flexible diaphragm having a U-shaped surrounding fold, and particularly is concerned with the structure of the stacked woven fabric reinforcing elements.

It is one object of the herein described invention to provide an improved fabric-reinforced flexible diaphragm and method of constructing the same, and in which the components can be more inexpensively and economically produced and assembled than those presently available.

A further object is to provide a flexible diaphragm structure having unique fabric reinforcing elements of multi-arm configuration, which can be die-cut from a rubber coated sheet material in roll form, and which can be economically successively laid up or stacked in superimposed relation with the arms in offset relation and their edges overlapped in a fraction of the time required to stack reinforcing elements of the ribbon type.

Another object is to provide in a flexible diaphragm, reinforcing elements of cross-shaped configuration with arms radiating from a central portion, in which right-angled threads of the fabric extend longitudinally and transversely of each arm, and in which the arms have opposite outwardly extending converging edges such that the cut threads at the opposite edges will be securely anchored, thus preventing fraying and dislodgment of threads along these edges which could, during use, work through the diaphragm material and provide a source of potential leakage.

Further objects and advantages of the invention will be brought out in the following part of the specification, wherein detailed description is for the purpose of fully disclosing an embodiment of the invention without placing limitations thereon.

BRIEF DESCRIPTION OF THE DRAWINGS

Referring to the accompanying drawings, which are for illustrative purposes only.

DESCRIPTION OF A PREFERRED EMBODIMENT

Figure 1:
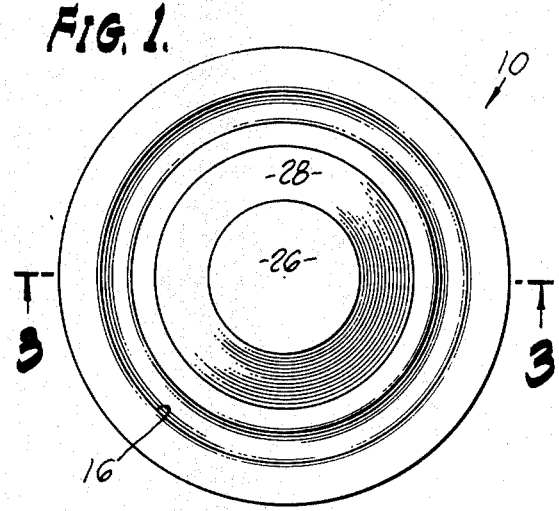
FIG. 1 is a top plan view of a diaphragm embodying the features of the present invention.

Referring more specifically to the drawings, for illustrative purposes, the present invention is illustrated in FIG. 1 as being embodied in a diaphragm 10 of a type employed for indicating pressure, and in other uses in which hydraulic diaphragms are utilized, such as for actuating brakes, pumps, and in various other numerous requirements, such as in devices controlled by fluid pressure.

More specifically, the diaphragm of the present invention is fabricated to provide a base member 12 of a molded suitable elastomeric material, and a reinforcing backing structure 14 of a woven fibrous material, such as woven nylon, cotton or the like. As will be clearly seen from the drawings, the base member 12 and reinforcing backing structure 14 are intimately connected, and at the periphery of the diaphragm are deformed to provide a surrounding U-shaped fold 16.

Figure 2:
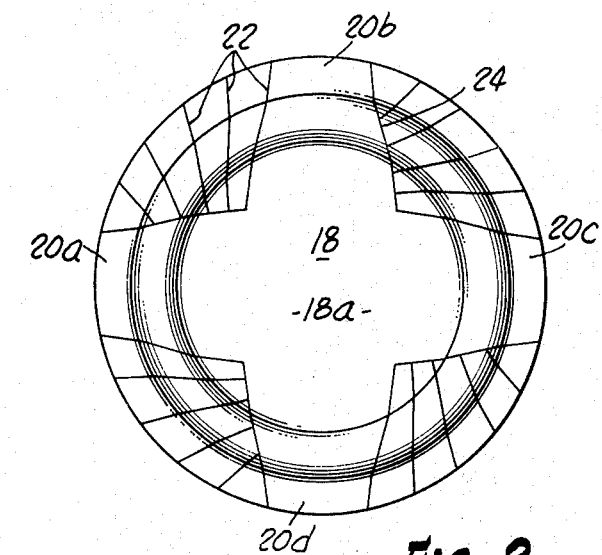
FIG. 2 is a bottom plan view showing the superimposition of the cross-shaped reinforcing elements.
Figure 3:
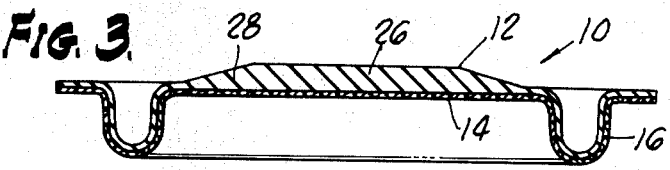
FIG. 3 is a transverse sectional view taken substantially on line 3—3 of FIG. 1.

As will be best seen from FIG. 2, the reinforcing backing structure is formed by a plurality of multiarmed cross-shaped members 18, each of these members being die-cut or otherwise formed from a sheet of woven material coated with a suitable rubber compound. In the illustrated configuration, the reinforcing member has four radiating arms 20a, 20b, 20c and 20d, which are in 90° relation and project outwardly from a central area 18a. Each arm is symmetrical and tapered towards its outermost end terminus, the arm having side edges 22 and 24 which converge outwardly from the central portion 18a.

The members 18 are successively stacked with their arm portions in offset or fanned relation so as to bring their edge margins into overlapped relationship. With an appropriate number of members 18 as thus mounted, a single reinforcing layer will be formed. It will be appreciated, however, that the reinforcing structure need not be limited to a single layer, but may have more than one layer by simply providing another set of overlapping members 18. The thickness and configuration of the central portion of the base member may vary for particular uses, and in the present instance is shown as being formed with a flat thickened central portion 26 which is peripherally beveled as indicated at 28, which lies adjacent the U-shaped fold 16.

Figure 4:
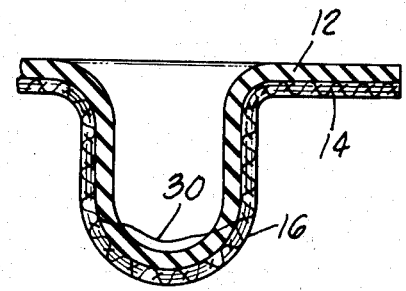
FIG. 4 is an enlarged fragmentary section of the U-shaped fold of the diaphragm and diagrammatically illustrating the effect of a dislodged thread.

The manner of fabricating the cross-shaped members is an extremely important feature of the present invention which comprises an improvement over the previous attempts to more economically produce the ribbons as used in the diaphragm of U.S. Pat. No. 2,678,065 by slitting them from a large coated fabric sheet. As previously pointed out, the slit strips had edge threads of the weave which extended parallel to the edge. As a consequence, the longitudinally extending edge threads were not anchored, and during use, these threads could become dislodged and work through the material of the base member as indicated at 30 in FIG. 4, and with the material of the fold 16 thus weakened, could produce diaphragm leakage. This problem has been overcome by the manner in which applicants produce the cross-shaped member 18.

Figure 5:
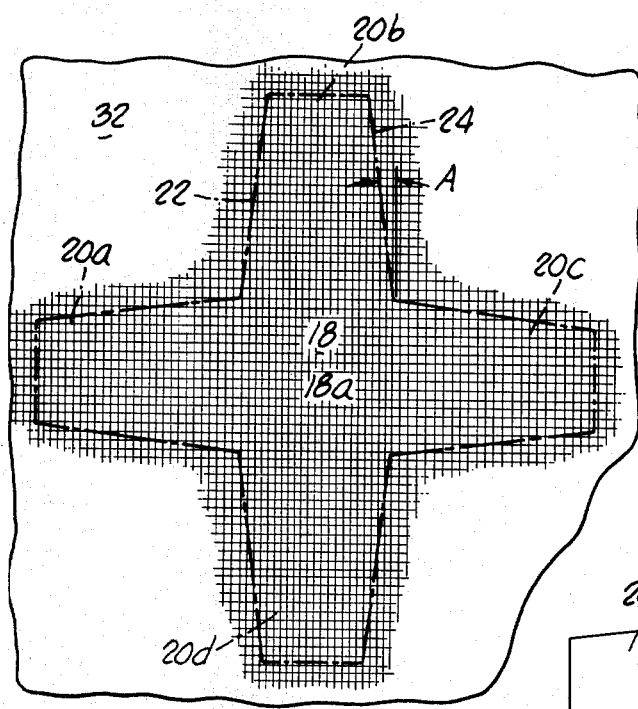
FIG. 5 is a view illustrating the manner in which the cross-shaped reinforcing element is die-cut from a coated sheet material.

As shown in FIG. 5, the cross-shaped member 18 is die-punched or otherwise formed from a large sheet 32 of woven fabric, preferably in roll form, which has been coated with a suitable rubber compound. The threads of the fabric sheet are in right-angled relation, and it is important that the configuration of the cross-shaped member 18 is properly oriented with respect to the direction of the threads of the sheet 32, so that one set of the threads will extend longitudinally of each of the arms 20a, 20b, 20c and 20d, while the other set of threads will extend transversely of each arm. As thus oriented, it will be apparent that the converging edges 22 and 24 of each arm will extend across and form a line of severance in angular relation to both sets of threads, so that the thread ends will be anchored by the coating material. The angle of convergence of each edge of an arm, as indicated a "A" will usually be of the order of 5° to 10°. Thus, fraying and dislodged threads at the edges of the arms will be eliminated.

Figure 6:
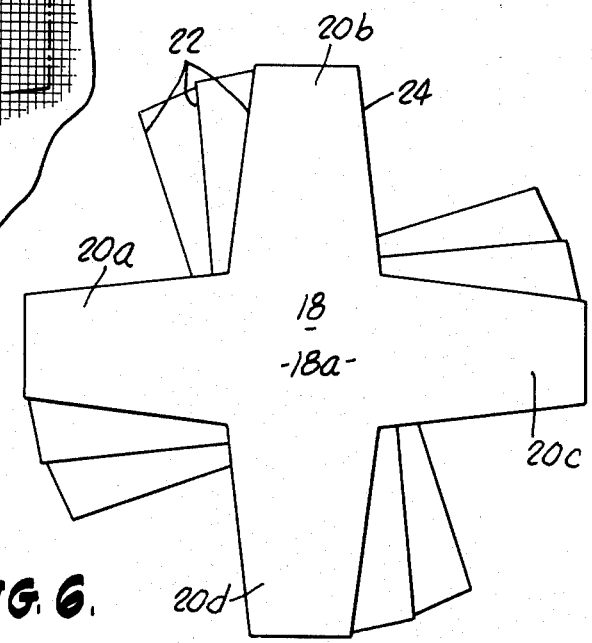
FIG. 6 is a view illustrating the manner of successively stacking the die-cut members with their arm portions offset so that their lateral edges overlapped.

A further feature of economic importance is that by forming the member 18 with a cross-shaped configuration, the time required for laying up the members in superimposed relation, over that required for the separate ribbon pieces as utilized in U.S. Pat. No. 2,678,065, is materially reduced. As shown in FIG. 6, the members 18 are fanned or offset in a direction to expose the edges 22 of the underlying members. It is to be understood, however, that the fanning may be in the opposite direction, if desired, in which case the edges 24 of the underlying members would be exposed.

Having fabricated the cross-shaped members in the manner explained above, and after they have been laid up or assembled in superimposed relation, as shown in FIG. 6, to provide a complete set of the required number of members 18, the stacked assembly is then subjected to a hot molding operation in which the base member 12 is formed to encase the stacked assembly and bondingly unite the base member and reinforcing backing structure to provide the required diaphragm configuration with the fold portion therein. A trimming operation will then be performed to remove the ragged end edges of the arms 20a – 20d and provide a smooth peripheral edge on the diaphragm.

From the foregoing description and drawings, it will be clearly evident that the delineated objects and features of the invention will be accomplished.

Various modifications may suggest themselves to those skilled in the art without departing from the spirit of our invention, and, hence, we do not wish to be restricted to the specific form or forms shown or uses mentioned except to the extent indicated in the appended claims.

We claim:

1. A diaphragm comprising:
   a. a deformable base member having a substantially U-shaped surrounding fold;
   b. a plurality of axially superimposed members of a woven fabric material molded to said base member, each of said members being preformed to provide: a central area, and a plurality of integral radially extending spaced apart arm portions;
   c. said superimposed members being in stacked relation with the arm portions of the adjacent members being successively overlapped and relatively offset, and extending across and being conformed to said U-shaped fold.

2. A diaphragm according to claim 1, in which the superimposed members are of a woven material having threads extending in right-angled relation.

3. A diaphragm according to claim 2, in which the threads of the woven material in each arm portion are so oriented that one set of the threads extend longitudinally of the arm in parallel relation and the other set of the threads extend transversely of the arm in parallel relation.

4. A diaphragm according to claim 2, in which the superimposed members are performed from a woven material in which the threads are coated with an elastomeric compound.

5. A diaphragm according to claim 1, in which said arms are tapered outwardly from said central area.

6. A diaphragm according to claim 1, in which opposite edges of each of said arms extend at an angle to both of said sets of threads.

7. A diaphragm according to claim 6, in which said opposite edges converge in an outward direction from said central area.

8. A diaphragm according to claim 1, in which each of said superimposed members is preformed to provide four arms which are oriented in 90° angular relation.

9. The method of fabricating a diaphragm, which comprises the steps of:

a. cutting cross-shaped members with radiating spaced arms from an elastomer-coated sheet material of woven fabric in which the threads are in crossing relation;

b. stacking a plurality of the cut members in superimposed axial relation with the radiating arms of adjacent cut members in successively overlapped and angularly offset relation; and c. thereafter subjecting the stacked members to a molding operation to encase the stacked members with an elastomeric material.

10. The method according to claim 9, in which the threads of the woven fabric are in right-angled crossing relation.

11. The method according to claim 10, in which the cutting of each member is oriented in relation to the threads of the fabric so that the right-angled threads will respectively extend longitudinally and transversely of each of the radiating arms.

12. The method according to claim 9, in which the cutting of each member is oriented in relation to the threads of the fabric so that opposite edges of the arms extend at an angle to both sets of threads of the fabric.

13. The method according to claim 9, in which the arms of each cross-shaped member radiate from a common central area.

14. The method according to claim 9, in which the arms have outwardly converging opposite side edges.

* * * * *